Dec. 10, 1957   K. E. NILSSON   2,815,884
INSULATING HANDLES FOR FRYING PANS AND THE LIKE
Filed Feb. 12, 1954
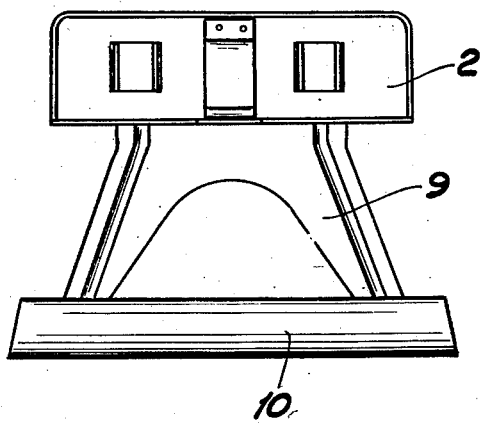
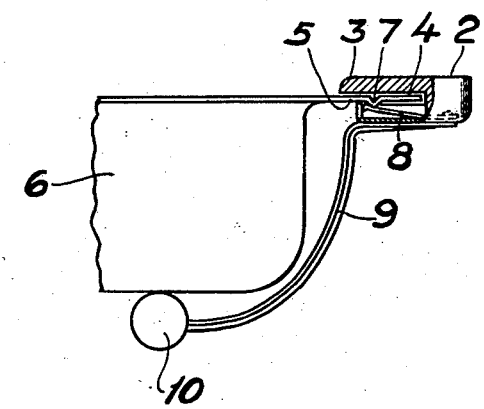
KARL EDVIN NILSSON
INVENTOR

United States Patent Office 2,815,884
Patented Dec. 10, 1957

2,815,884
INSULATING HANDLES FOR FRYING PANS AND THE LIKE

Karl Edvin Nilsson, Lannersta, Sweden

Application February 12, 1954, Serial No. 409,971

Claims priority, application Sweden August 21, 1953

1 Claim. (Cl. 220—94)

The present invention relates to an insulating handle for frying pans and the like. Handles of this kind are applied to the hot pans when coming from the oven. Thus, the handles may be grasped by both hands. However, the pan cannot be placed directly on a table without an intermediate insulation plate because the bottom of the hot pan would damage the table-top. Furthermore, the use of intermediate plates is troublesome. Said drawbacks are eliminated by the handle according to the invention. The handle is substantially characterized in that an arm or the like is secured to the same, preferably to the lower side thereof, said arm being in its free end, which extends below the bottom of the pan when the handle is applied to the pan, provided with one or more enlarged portions or downwards directed projections which consist of, or are coated with, an insulating material and which are adapted to rest against a support so that a pan which is placed on the support, e. g. a table-top, is insulated therefrom. According to the invention the enlarged portion of the handle may be in the form of a rod which preferably is perpendicular to the arm and preferably so arranged that it rests against the bottom of the pan and firmly supports the pan.

The handle according to the invention is illustrated by way of example in the accompanying drawing.

Fig. 1 shows a top view of the handle, an upper insulating plate being removed.

Fig. 2 shows a side view of the handle, partly in section, together with part of a frying pan.

Numeral 2 designates the insulating handle proper which may be designed in any suitable manner. According to Fig. 2 the upper portion of the handle is provided with an insulating wooden block 3 having a slot 4 for receiving the flange 5 of the pan 6. Said flange has a depressed portion or nose 7 which is engaged by a spring 8 in the handle when the flange is completely inserted into the slot. The insulating handle 2 is covered with metal on its outer sides and on its lower side. To the lower side of the handle 2 there is fixed a pair of arms 9 preferably of V-shaped cross sectional area which are designed in such a way that when the handle engages the flange 5, the lower ends of the arms are located below the pan, as will be seen in Fig. 2. To the lower ends of the arms there is fixed a rod 10 of insulating material, e. g. wood, preferably of the same kind as the wooden piece 3. The rod 10 is arranged in such a manner that two rods, one for each handle, firmly support the pan.

The invention is not restricted to the embodiment shown, but the details thereof may be varied without going beyond the scope of the invention.

Having now described my invention, what I claim as new and desire to secure by Letters Patent is:

In combination with a cooking utensil having a flange extending laterally beyond the cooking portion thereof, said flange having a dependent nose, a detachable handle and support for said utensil comprising a metal handle portion including a top, a bottom, and an outer side, a wooden block affixed to the underside of said top, said block and said bottom being vertically spaced to provide a slot for receiving said flange, a spring affixed to said bottom and frictionally engageable with said nose to detachably hold said flange in said slot, a pair of dependent arcuate legs affixed to the bottom of said handle portion, and a horizontally extending rod of insulating material affixed to the lower ends of said legs and underlying said utensil when said handle portion is engaged with said flange.

References Cited in the file of this patent

UNITED STATES PATENTS

| | | |
|---|---|---|
| 496,422 | Ligon | May 2, 1893 |
| 511,189 | Barthold | Dec. 19, 1893 |
| 850,983 | Valiquette | Apr. 23, 1907 |
| 859,850 | Sliga | July 9, 1907 |
| 864,046 | Trainham | Aug. 20, 1907 |
| 1,280,387 | Bunzel | Oct. 1, 1918 |
| 1,499,670 | Kuno | July 1, 1924 |
| 1,719,461 | Bolton | July 2, 1929 |
| 2,120,220 | Preston | June 7, 1938 |
| 2,162,961 | Mattoon | June 20, 1939 |
| 2,211,030 | Rutenber | Aug. 13, 1940 |
| 2,212,065 | Fischer | Aug. 20, 1940 |
| 2,254,571 | Hailey | Sept. 2, 1941 |
| 2,553,908 | Forman | May 22, 1951 |

FOREIGN PATENTS

| | | |
|---|---|---|
| 784,609 | France | Apr. 29, 1935 |